United States Patent [19]
Kroon

[11] Patent Number: 5,588,094
[45] Date of Patent: Dec. 24, 1996

[54] POST-PROCESSING BIT-MAP DECIMATION COMPENSATION METHOD FOR PRINTING HIGH QUALITY IMAGES

[75] Inventor: Stephen M. Kroon, Lake Oswego, Oreg.

[73] Assignee: Tektronix, Inc., Wilsonville, Oreg.

[21] Appl. No.: 176,611

[22] Filed: Jan. 3, 1994

[51] Int. Cl.$^6$ ................................................. G06K 1/00
[52] U.S. Cl. ........................................ 395/109; 358/456
[58] Field of Search .................................... 395/101, 109, 395/111, 117, 128, 102, 110, 118, 123, 132; 358/429, 432, 447, 448, 454, 456, 459; 382/266, 267

[56] References Cited

U.S. PATENT DOCUMENTS

| | | | |
|---|---|---|---|
| 4,629,342 | 12/1986 | Futaki | 395/108 |
| 4,736,315 | 4/1988 | Ozaki et al. | 395/129 |
| 4,853,970 | 8/1989 | Ott et al. | 382/266 |
| 5,044,796 | 9/1991 | Lund | 395/108 |
| 5,052,834 | 10/1991 | Feistel et al. | 395/108 |
| 5,087,981 | 2/1992 | Ng et al. | 358/459 |
| 5,130,823 | 7/1992 | Bowers | 358/465 |
| 5,161,213 | 11/1992 | Knowlton | 395/128 |
| 5,195,175 | 3/1993 | Kanno et al. | 395/106 |
| 5,249,242 | 9/1993 | Hanson et al. | 382/54 |
| 5,270,728 | 12/1993 | Lund et al. | 395/108 |
| 5,278,671 | 1/1994 | Takahashi et al. | 358/459 |
| 5,396,584 | 3/1995 | Lee et al. | 395/132 |

OTHER PUBLICATIONS

Stoffel, J. C. and Moreland, J. F., "A Survey of Electronic Techniques For Pictorial Image Reproduction," *IEEE Transactions On Communications*, vol. Com–29, No. 12, Dec. 1981, pp. 1898–1925.

Ulichney, Robert, *Digital Halftoning*, 1987, pp. 1–11, 77–98, 110–139, 187–208, 343, and 344.

Primary Examiner—Edward L. Coles, Sr.
Assistant Examiner—Gabriel I. Garcia
Attorney, Agent, or Firm—Ralph D'Alessandro; Paul S. Angello

[57] ABSTRACT

A digital halftone pattern geometry adapted not to the characteristics of variable dot size printing presses but to the operating characteristics of the printer itself achieves a high degree of image quality. Techniques for creating the halftone pattern geometry include linear spot growth to provide uniform darkening and the use of a super-cell structure to maximize the number of tint or gray scale levels. A preferred super-cell structure is of hexagonal dispersed-dot form to reduce low frequency artifacts by spreading them over a greater number of frequencies. An increase in addressability to enhance printer resolution in the direction of the path of print medium travel with no change in dot size will cause placement of overlapping dots when a darkening of consecutive pixels in the direction of print medium travel is called for in the halftone pattern. Post-processing bit-map decimation compensation on bit map image data just before they are transmitted to the printer for printing reduces excessive dot overlap but maintains edge information. The removal from the bit map data corresponding to obscured dots renders nonoverlapping dots occupying a region of the same size as that if no bit-map decimation had been implemented.

8 Claims, 12 Drawing Sheets

POST-PROCESSING BIT-MAP DECIMATION COMPENSATION METHOD FOR PRINTING HIGH QUALITY IMAGES

TECHNICAL FIELD

This invention relates to digital image printing (e.g., thermal transfer, phase-change (hot melt) ink jet, and laser xerography) and, in particular, to a method for implementing post-processing bit map decimation compensation on bit map data to reduce excessive dot overlap but maintain edge information to preserve detail in output images produced by digital image printers.

BACKGROUND OF THE INVENTION

Thermal transfer printing entails the controlled transfer of an ink (e.g., a colorant dispersed in a wax base material) from a carrier such as a polymer ribbon onto a print medium surface. A thermal transfer printer having a print head with a large number of independently activable heating elements per unit of length is one prior art apparatus employed for this purpose. The ink/carrier structure is placed within the printer such that the carrier side is adjacent the heating elements and the ink side is adjacent a print media support upon which the print medium rests during printing.

To print an image, the print head contacts the polymer ribbon and ink is transferred to particular locations on the print medium surface when predetermined combinations of heating elements are activated adjacent the image-forming locations. The ink/carrier structure is locally heated by the heating elements to a temperature at or above the melting point of the ink. In this manner, an amount of ink softens and adheres to the print medium at the predetermined locations to form the image.

Color images are printed with an ink/carrier structure that includes separate regions of differently colored inks such as the subtractive primary colors, yellow, magenta, and cyan. Color printing is accomplished by sequential passes of the print medium past the print head, each pass selectively transferring different colored inks at predetermined times. Thermal printing ribbons are available with a single black panel, three color panels (yellow, magenta, and cyan), or four color panels, (yellow, magenta, cyan, and black).

Many printers include a control software driver program (hereafter "printer driver") for handling various aspects of the printer operation. Such printer drivers are often interfaced to a computer programming language known as PostScript®, which is available from Adobe Systems Inc., Mountain View, Calif. The PostScript® language, described in the PostScript® Language Reference Manual, Second Edition, 1990, Addison-Wesley Publishing Co., Reading, Mass., includes methods for manipulating text and graphics, selecting media sizes, types, trays, and the number of copies to be printed.

A thermal transfer printer typically transfers quantities of ink of a single volume that produce on a print medium dots of ink sized to provide "solid fill" printing at a given resolution, such as 300 dots per inch ("dpi") (12 dots per millimeter ("dpm")). Single dot size printing is acceptable for most test and graphics printing applications not requiring "photographic" image quality. Photographic image quality normally requires a combination of high dot-resolution and an ability to modulate a reflectance (i.e., gray scale) of dots forming the image.

In single dot size printing, average reflectance of a region of an image is typically modulated by a process referred to as "dithering" in which the perceived intensity of an array of dots is modulated by selectively printing the array at a predetermined dot density. For example, if a 50 percent local average reflectance is desired, half of the dots in the array are printed.

An image is formed by the tessellation of multiple cells or "tiles," which are clusters of pixels arranged in a predetermined pattern. The pixels correspond to dots printed on a page. Each cell has the same number of pixel locations arranged in the same pattern. The number of pixels filled in a cell determines its darkness, and there is a specified "fill order" for darkening certain pixels in a cell as its darkness increases. The number of pixels selected for a cell presents a tradeoff between the resolution and number of available gray levels of the resulting image. A greater number of pixels reduces image resolution but increases the number of available gray levels. Replication of tessellated cells of varying darknesses form the printed image.

An important characteristic of thermal wax printers is their inability to place individual dots independently of neighboring dots. This characteristic, which is shared by other common printing technologies, is complicated by a high sensitivity to the thermal history of the print head.

The lack of pixel independence imposes an ordering of clusters. Clustered-dot halftoning partitions the addressable area into a relatively low frequency tiling of the printed page, as compared with the resolution of the device. Each one of multiple pixel clusters is populated from the center out to simulate an oval spot of variable size of the sort printed (but at a much higher frequency than dots printed) on a printing press.

The tendency to simulate conventional printing methods is reinforced in PostScript® in which the primary, and originally the only, way to specify a digital halftone was with a screen angle, frequency, and spot fill function (normally a simple distance from center function) for each primary color. Working within the framework of the PostScript® halftone screen specification, several significant improvements have been implemented to improve the quality of thermal wax output on PostScript® compatible Tektronix printers. These improvements include a spiral spot (dot cluster) growth pattern to reduce unwanted cluster-to-cluster interactions; aligned halftone screens to avoid moire (rosette) patterns; and "supercell" grouping of spots to increase tint levels while retaining high frequency detail.

FIG. 1 shows a prior art cell grouping of twenty-nine pixels arranged in a square pattern with pixel attached to each vertex of the square as shown. The numbers identifying each pixel in FIG. 1 represent the order in which the pixels in the cell are darkened and indicate a spiral spot growth pattern starting from pixel 0 in the center and moving counter-clockwise around pixel 0 to pixels 25, 26, 27, and 28 at the vertices. FIG. 2 shows a prior art super-cell structure and spot growth visitation order for an array of nine halftone cells of the type shown in FIG. 1. FIG. 3 shows three super-cell structures of FIG. 2 arranged to define a prior art super-cell tessellation geometry. FIG. 4 shows an image halftoned using the screen corresponding to the tessellation geometry of FIG. 3.

The halftoning method depicted in FIGS. 1–4 was implemented on, for example, the Phaser PX, Phaser PXi, Phaser II PXi, and Phaser 200 printers manufactured by Tektronix, Inc., the assignee of this application. These printers had 300×300 dpi (12×12 dpm) addressability and exhibited good image quality because of the super-cell spiral spots.

The Phaser 200, a faster and less expensive thermal wax printer, presented certain new problems when used with the prior halftoning technique described above. The faster print speed set new limits on dot geometries that would produce consistent results. The relatively complex cell shapes used in the prior technique caused nonuniform darkness changes across tint levels. These were compensated for with gamma correction to produce an acceptable result, but at the cost of a significant reduction in the number of tint or gray scale levels.

In a subsequent Tektronix product, the Phaser 220, the addressability was increased to 600 dpi (24 dpm) in the direction of paper motion to increase printer resolution, but dot size remained the same. To take full advantage of increased resolution, a much higher frequency halftone pattern was needed. In addition, a new pattern would be needed to accommodate overlapping dots, an asymmetric grid, and the geometry limitations described above. Such needs cannot be met by the existing halftone method.

SUMMARY OF THE INVENTION

An object of this invention is, therefore, to provide a method for reducing excessive dot overlap to preserve detail in printed images.

Another object of this invention is to provide a halftone pattern geometry that is compatible with the method of reducing excessive dot overlap.

A further object of this invention is to implement such a method and halftone pattern geometry in a thermal transfer printer to increase its addressability and consequent image resolution.

The present invention achieves a higher degree of image quality by implementing digital halftoning techniques that are adapted not to the characteristics of variable dot size printing presses but to the operating characteristics of the printer itself. The techniques include linear spot growth to provide uniform darkening and the use of a super-cell structure to maximize the number of tint or gray scale levels. A preferred super-cell structure is of hexagonal dispersed-dot form to reduce low frequency artifacts by spreading them over a greater number of frequencies. Hexagonal centered super-cells also distribute row and column artifacts along three axes of symmetry instead of two.

In a preferred embodiment, the pixels in a single-pixel wide linear halftone cell grow in one direction. The fill order (i.e., darkening sequence of the pixels in the cell) is of importance to the extent that the printed spot appears connected (i.e., has no gaps) at every tint or gray scale level. The cells are clustered in a super-cell structure that provides a dispersed-dot ordered dither for a regular hexagonal grid containing nine elements. The super-cell structure is configured in the asymmetric hexagonal grid to provide perceptibly uniform darkening from asymmetric halftone cells. The "visitation order" of darkening selected pixels in a specified sequence of linear cells in the super-cell structure provides a nested dot growth pattern dither process. A preferred visitation order results in each cell being within one gray scale level of every other cell in the super-cell structure.

The super-cell structure gives sharp edges and a greater amount of edge area available to manipulate when the super-cells are tessellated to form an image. This halftone cell arrangement is especially suited to thermal transfer printers, which provide uniform separation between thin lines in the direction of paper motion. The resulting image exhibits smooth darkening, even for cells having few pixels. This is so because all levels of cell growth exhibit the same cell edge profile. With a one-pixel wide cell, more high frequency detail can be resolved and high frequency input images have a smaller distorting effect on the halftone cell structure. The use of a linear halftone cell makes possible uniform image darkening on grids with any addressability aspect ratio.

The digital halftoning techniques permit an increase in addressability to enhance printer resolution. No change in dot size in the direction of increased resolution such as the direction of the path of print medium travel will, however, cause placement of overlapping dots when a darkening of consecutive pixels in the direction of increased resolution is called for in the halftone pattern. The present invention reduces excessive dot overlap but maintains edge information by performing post-processing bit-map decimation compensation on bit map data just before they are transmitted to the printer for printing. The removal from the bit map data corresponding to obscured dots renders nonoverlapping dots occupying a region of the same size as that if no bit-map decimation had been implemented.

Additional objects and advantages of this invention will be apparent from the following detailed description of preferred embodiments thereof which proceeds with reference to the accompanying drawings.

DETAILED DESCRIPTION OF PREFERRED EMBODIMENTS

Figure 5:
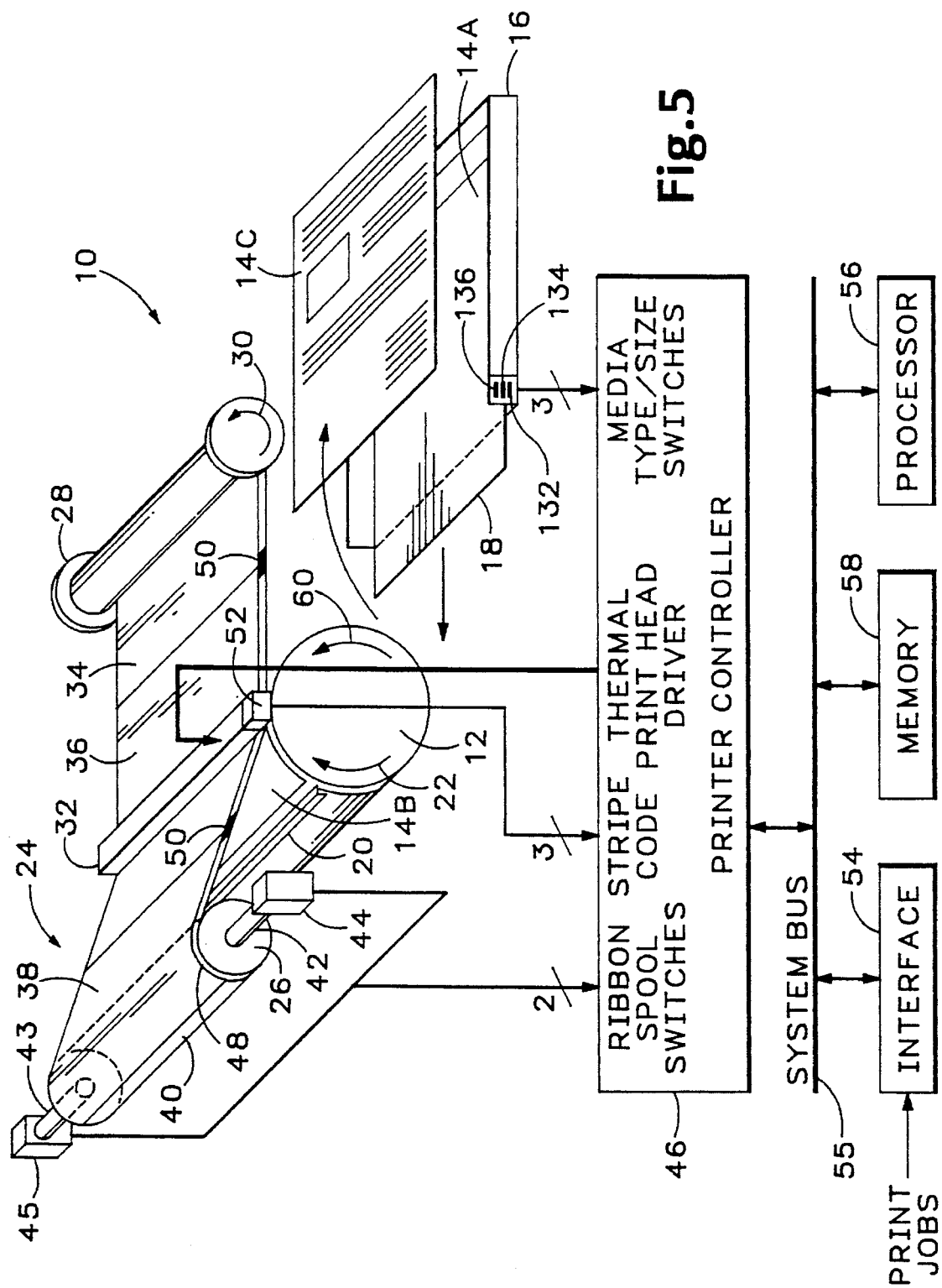
FIG. 5 is a functional schematic diagram showing the interrelationship among the electromechanical components of a thermal transfer printing system used in implementing the invention.

With reference to FIG. 5, a thermal transfer printing system 10 (hereafter "printer 10") includes a drum 12 upon which a print medium 14A is received from a media tray 16. (Print medium 14 is shown in printer 10 at three locations designated by a letter suffix, i.e., 14A, 14B, or 14C.) A leading edge 18 of print medium 14A is fed by conventional means to a medium clamp 20 that secures print medium 14B to drum 12, which then rotates in a direction indicated by arrow 22 to wrap print medium 14B around drum 12. Drum 12 is preferably of a diameter sufficient to hold extended-length A4-size media and is coated with rubber to enhance media-to-drum dimensional stability and thermal transferability of ink to print medium 14B.

Printer 10 also includes a thermal transfer ribbon 24 suspended between a supply spool 26 and a take-up spool 28. Take-up spool 28 is driven in a direction indicated by arrow 30 with a torque sufficient to feed ribbon 24 through a nip formed between drum 12 and a thermal print head 32 at a rate determined by the rotation of drum 12. Ribbon 24 preferably includes repeating sets of pre-coat 34, yellow 36, magenta 38, and cyan 40 panels. Many commercially available ribbons do not include precoat panels 34.

In operation, printer 10 receives a print job at a data communications interface 54. The print job is transferred to a system bus 55 that is in communication with a printer controller 46, a processor 56, and a memory 58. Processor 56 processes data and commands contained in the print job and transmits control and printing data to printer controller 46. Processor 56 executes the printer driver stored in memory 58, and exchanges data with a PostScript® interpreter.

After the print job is interpreted by processor 56 and stored as yellow, magenta, and cyan image data in memory 58, printer controller 46 causes print medium 14A to feed from media tray 16 to medium clamp 20 on drum 12. Medium clamp 20 is activated, and drum 12 is caused to rotate such that leading edge 18 of print medium 14B is just past the nip between drum 12 and thermal print head 32. Ribbon 24 is moved by take-up spool 28 until a coded marker 50 on ribbon 24 is detected by a photosensor array 52 that is mounted adjacent thermal print head 32, thereby indicating a pre-coat panel 34 is positioned under thermal print head 32.

Drum 12 is rotated one revolution and pre-coat panel 34 is moved through the nip while all the image data stored in memory 58 simultaneously drive thermal print head 32, thereby thermally transferring a pre-coat image to print medium 14B and advancing ribbon 24 such that yellow panel 36 is in the nip. Drum 12 is rotated a second revolution and yellow panel 36 is moved through the nip while the yellow image data stored in memory 58 simultaneously drive thermal print head 32, thereby thermally transferring a yellow image to print medium 14B and advancing ribbon 24 such that magenta panel 38 is in the nip. The sequence is repeated for the magenta and cyan image data until a full color image is transferred and registered on top of the pre-coat image on print medium 14B. Drum 12 reverses and rotates in the direction of an arrow 60, releases medium clamp 20, and feeds print medium 14C from printer 10 by means of a conventional exit path mechanism (not shown).

Figure 6:
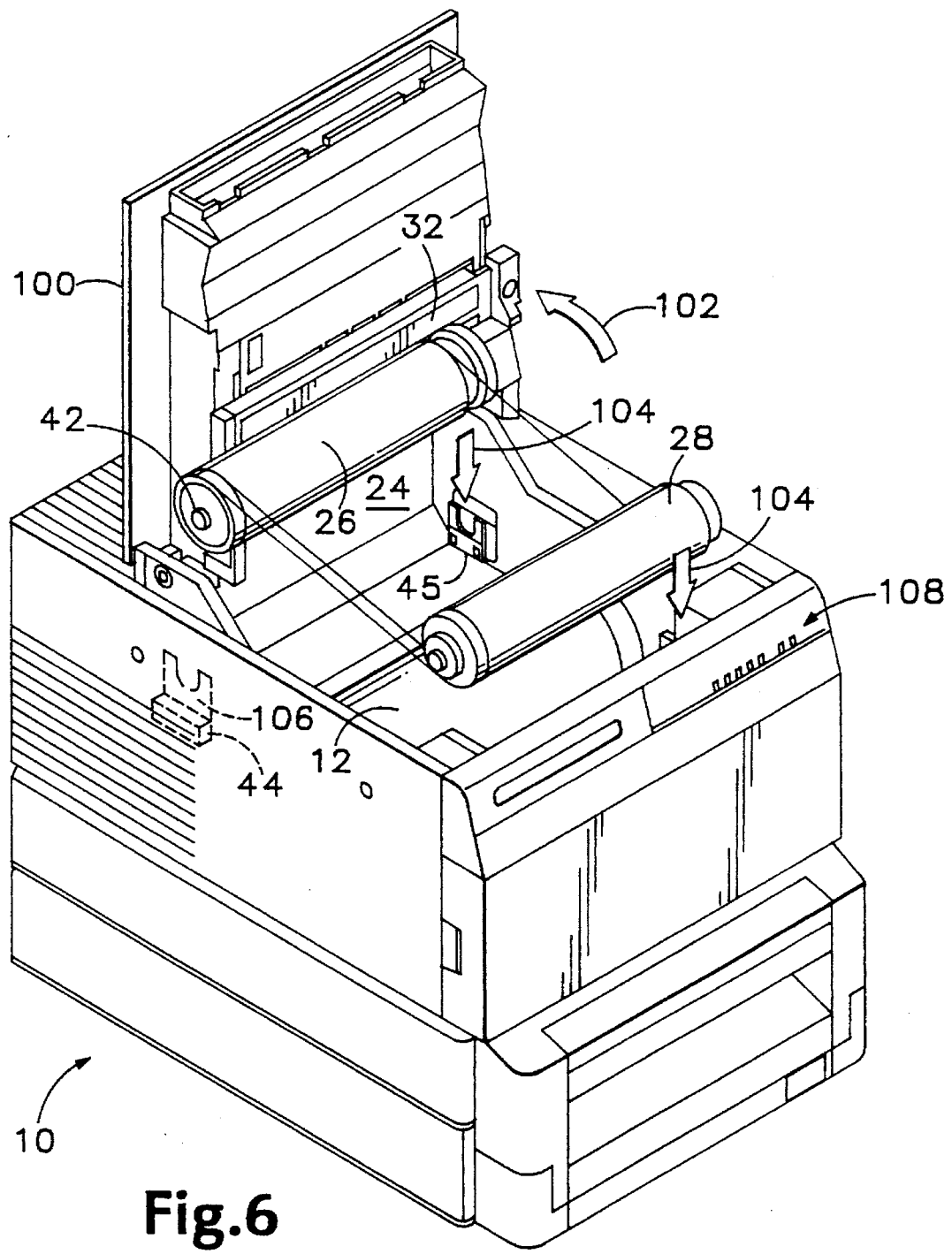
FIG. 6 is an isometric pictorial diagram of a thermal transfer printer of FIG. 4 showing a ribbon access door in an open position to expose major components of the printer.

FIG. 6 shows printer 10 with a ribbon access door 100 shown in an open position indicated by an arrow 102 to expose ribbon 24 in a position removed from printer 10. Ribbon 24 is installed by lowering supply spool 26 and take-up spool 28 into printer 10 in the direction of arrows 104. If ribbon 24 includes pre-coat panel 34, supply spool 26 will have an extended-length left hub 42 that activates a left hub microswitch 44 (shown in phantom) mounted adjacent a hub support 106 (shown in phantom). Also shown are drum 12, thermal print head 32, and a set of status indicators (shown generally as indicators 108).

A more complete description of the interpretation of the print job by processor 56 and its interaction with printer controller 46 to form a printed image follows with reference to FIGS. 7–10.

Figure 7:
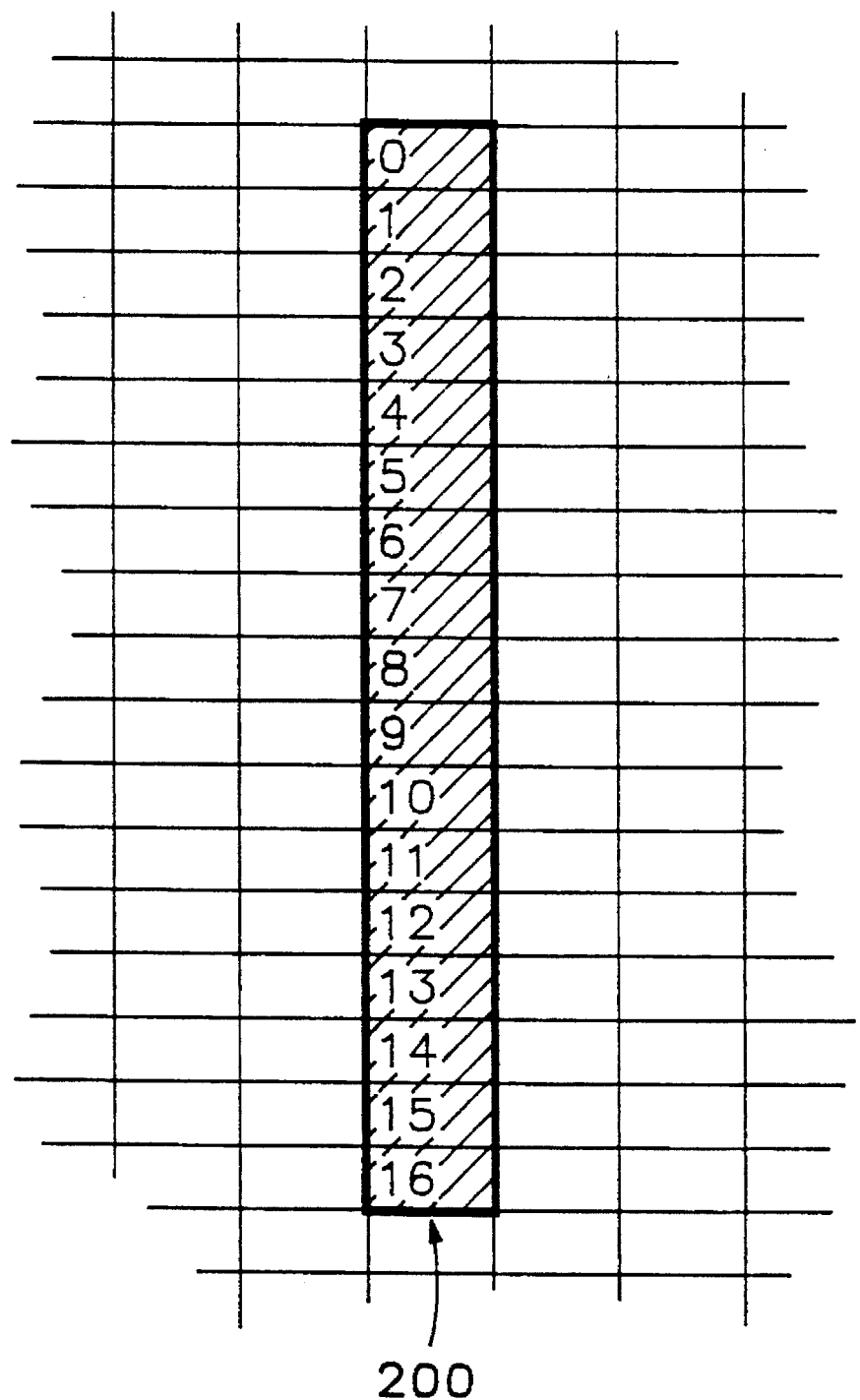
FIG. 7 shows a preferred linear halftone cell of the invention.

FIG. 7 shows a 1×N pixel halftone cell 200 used to create a halftone pattern geometry on a 300×600 dpi (12×24 dpm) grid in accordance with the invention. In one embodiment, cell 200 includes 17 pixels (i.e., N=17). In FIG. 7, each of the rectangular pixels is consecutively numbered from 0 to 16 to indicate spatially asymmetric spot growth as pixels are progressively darkened to achieve a perceived monotonic darkening of cell 200. Because it is one pixel wide, cell 200 is characterized by linear spot growth and has, therefore, a dominant length dimension.

The order of darkening the pixels to cause linear spot growth is called "spot fill order." A number of possible spot fill orders can achieve monotonic darkening. A first possible spot fill order is unidirectional darkening, which entails initially darkening a first terminal pixel, progressively darkening adjacent pixels, and finally darkening a second terminal pixel. This is the spot fill order shown in FIG. 7 with pixels 0 and 16 representing the terminal pixels. A second possible spot fill order is center-weighted, bidirectional darkening, which entails initially darkening a medial pixel of cell 200 and alternately darkening adjacent pixels on either side of the medial pixel outwardly toward two terminal pixels. For pixel growth from the center of cell 200, pixel 0 represents the center pixel and pixels 15 and 16 represent the terminal pixels. A third possible spot fill order is center-weighted, bidirectional, nonconsecutive darkening, which entails leaving a gap between adjacent pixels during the fill process. This spot fill order is otherwise similar to the second spot fill order. For comparison purposes, the diagrams below show from left to right the respective first, second, and third possible spot fill order examples described above.

| 0 | 15 | 13 |
| --- | --- | --- |
| 1 | 13 | 15 |
| 2 | 11 | 9 |
| 3 | 9 | 11 |
| 4 | 7 | 5 |
| 5 | 5 | 7 |
| 6 | 3 | 1 |
| 7 | 1 | 3 |
| 8 | 0 | 0 |
| 9 | 2 | 4 |
| 10 | 4 | 2 |
| 11 | 6 | 8 |
| 12 | 8 | 6 |
| 13 | 10 | 12 |
| 14 | 12 | 10 |
| 15 | 14 | 16 |
| 16 | 16 | 14 |

The fill order of cell 200 appears to be unimportant as long as the spot printed has no perceptible gaps at every tint or gray scale level. Such perception would depend significantly on the printer characteristics, which dictate the best fill order.

Since preferred cell 200 is only one pixel wide, a halftone pattern geometry formed with cell 200 resolves high frequency detail and on high resolution input images has a smaller distorting effect than that which is characteristic of prior art cell geometries. A multi-pixel wide cell with a dominant length dimension is also possible. Applicant has achieved satisfactory image quality with a two-pixel wide cell. The length of (i.e., the number "N" of pixels in) the 1×N cell is constrained by the emergence of low frequency artifacts in the printed image. Skilled persons will appreciate that long, spatially asymmetric shapes other than the linear cell 200 described can be used to practice the invention. Moreover, cell 200 can be rotated by 90° for horizontal spot growth.

Halftoning has traditionally been achieved by a rectangular grid of cells. In the embodiment described below, the cells are arranged not on a rectangular grid but in a pattern approximating a hexagonal grid angularly displaced from horizontal. This geometry minimizes perceived patterning by taking into account the sensitivity of the human visual system to vertically and horizontally aligned artifacts and distributing row/column artifacts along three axes of symmetry instead of two.

Figure 8:
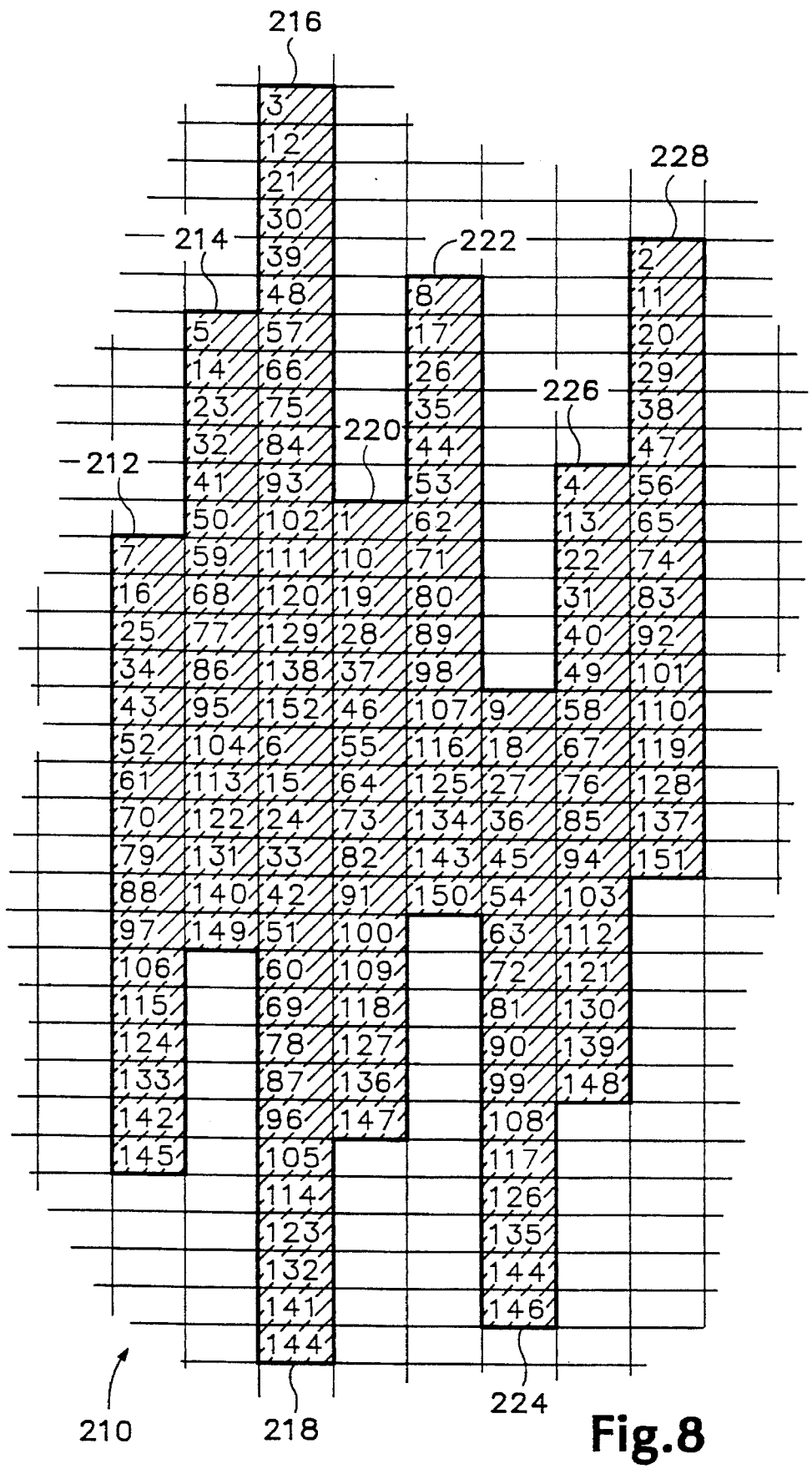
FIG. 8 shows a hexagonal super-cell structure of and a preferred spot growth visitation order for an array of nine halftone cells of the type shown in FIG. 6.

To increase the number of perceivable gray scale levels, a group of cells 200 is assembled in a super-cell structure. FIG. 8 shows a hexagonal super-cell 210 comprised of nine halftone cells of the type shown in FIG. 7, seven of which have both of their terminal pixels left free to contact the terminal pixels of other super-cell structures 210 in a tessellation pattern and two of which have an end-to-end terminal pixel contacting relationship.

With reference to FIG. 8, cells 212, 216, 218, 222, 224, and 228 are positioned side-by-side and are staggered lengthwise so that six pixels located at an end of each of the cells are open and available to contact pixels of another super-cell structure to form an interdigitated tessellation pattern, which is described below with reference to FIG. 9. Cells 214 and 220 each have one six-pixel long side and cell 226 has two six-pixel long sides available for contacting a cell of another super-cell structure 210. The placement of cells 216 and 218 in an end-on-end relation facilitates this geometry and defines the maximum length of super-cell structure 210. The preferred super-cell structure 210 has, therefore, a majority of the halftone cells arranged so that their lengths are positioned adjacent one another and so that there is no side-by-side spatial relationship between corresponding terminal pixels of adjacent cells.

In FIG. 8, each of the pixels is numbered from 0 to 152 to represent the visitation order defined by the repetition of a sequence of darkening pixels in super-cell structure 210. The preferred darkening order sequence entails darkening a pixel in each of the cells of super-cell structure 210 before darkening another pixel in a cell prior to completion of the sequence. Thus, each cell is within one gray scale level of every other cell in super-cell structure 210. The visitation order results in spatially asymmetric spot growth in each of the nine cells, as was described above with reference to FIG. 7. The visitation order of super-cell 210 permits, therefore, halftoning among halftone cells to achieve the desired number of tint or gray scale levels.

The embodiment uses a super-cell tile structure of the form

```
    3
  5 8 2
  7 1 4
   6 9
``` in which the numbers indicate the darkening order sequence for the nine cells in the super-cell structure. Because this pattern is a recursive tessellation, artifacts are split across multiple frequencies and are not limited to the frequency of super-cell replication that characterizes clustered-dot ordered dither patterns. The nine level super-cell pattern built on a 17 pixel-based cell provides 9×17+1=154 tint or gray scale levels.

Skilled persons will appreciate that a super-cell structure may include different numbers of cells and cells having different numbers of pixels from those described for super-cell structure 210.

Figure 9:
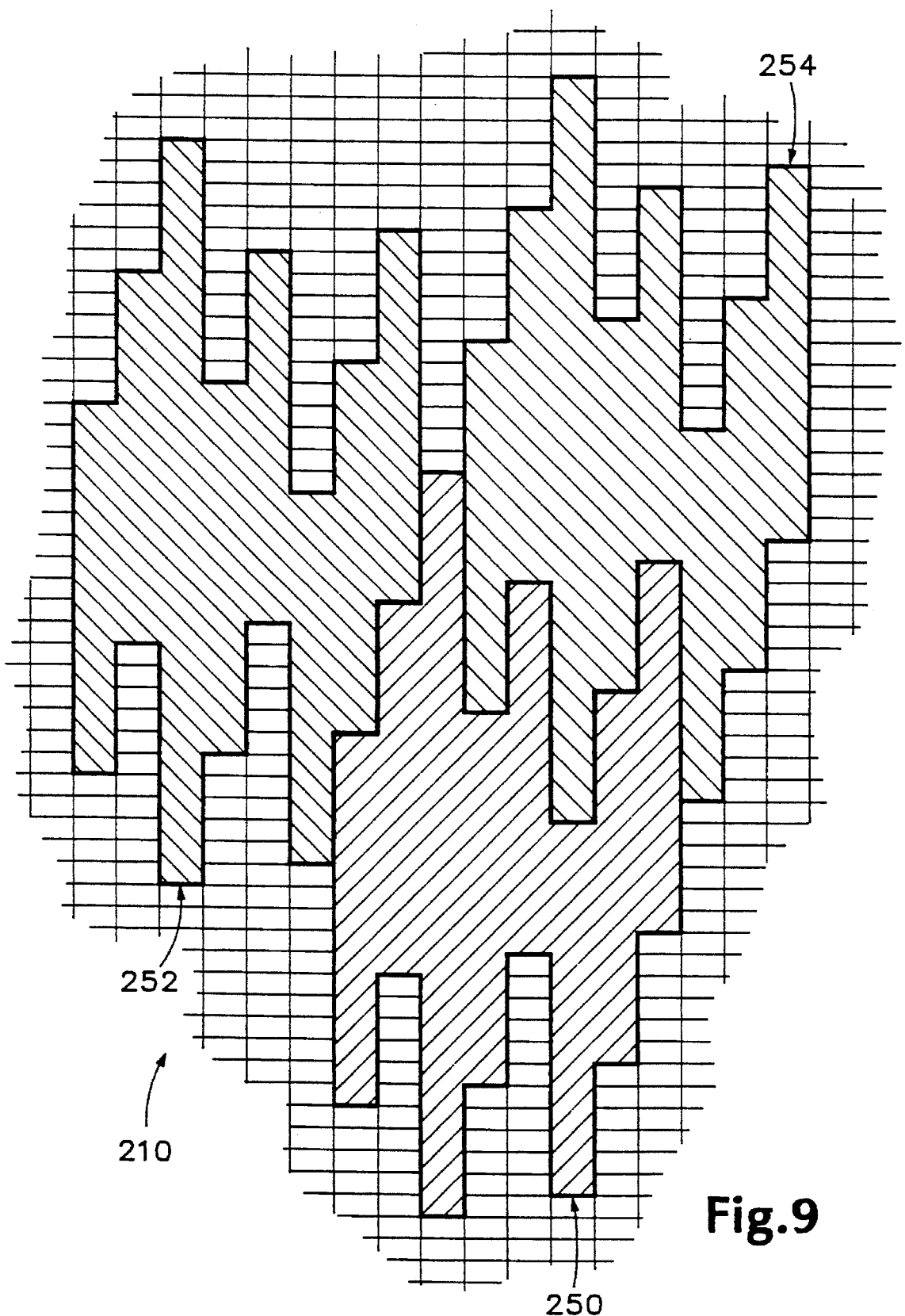
FIG. 9 shows the relative positioning of three super-cell structures of FIG. 7 to define a preferred super-cell inter-digitated tessellation geometry.

FIG. 9 shows the relative positioning of three super-cell structures 210 that define an interdigitated super-cell tessellation geometry that is replicated to tile the plane.

With reference to FIG. 9, super-cell structures 250, 252, and 254 each have opposed super-cell extreme boundaries, each of which is defined by the length of a halftone cell. The super-cell structures are tessellated to form a super-cell pattern characterized in that only one halftone cell of super-cell structure 250 is positioned between one of the boundaries of super-cell structure 252 and one of the boundaries of super-cell structure 254. Each of the halftone cells in super-cell structures 250, 252, and 254 includes first and second terminal pixels. Super-cell structures 250, 252, and 254 are tessellated to form a super-cell pattern characterized by the first and second terminal pixels of the halftone cells of super-cell structure 252 being positioned adjacent none of the first and second terminal pixels of the halftone cells of super-cell structure 254, and by different first terminal pixels of the halftone cells of super-cell structure 250 being positioned adjacent at least two second terminal pixels of the halftone cells of each of super-cell structures 252 and 254.

Figure 10:
FIG. 10 shows an image halftoned using the screen corresponding to the tessellation geometry of FIG. 9.

FIG. 10 represents an image halftoned using the screen corresponding to the tessellation geometry of FIG. 9. FIG. 10 is formed on a 300×600 dpi (12×24 dpm) grid using the 1×17 pixel cell 200 of FIG. 7 and 9-cell super-cell structure 210 of FIG. 8.

Figure 1:
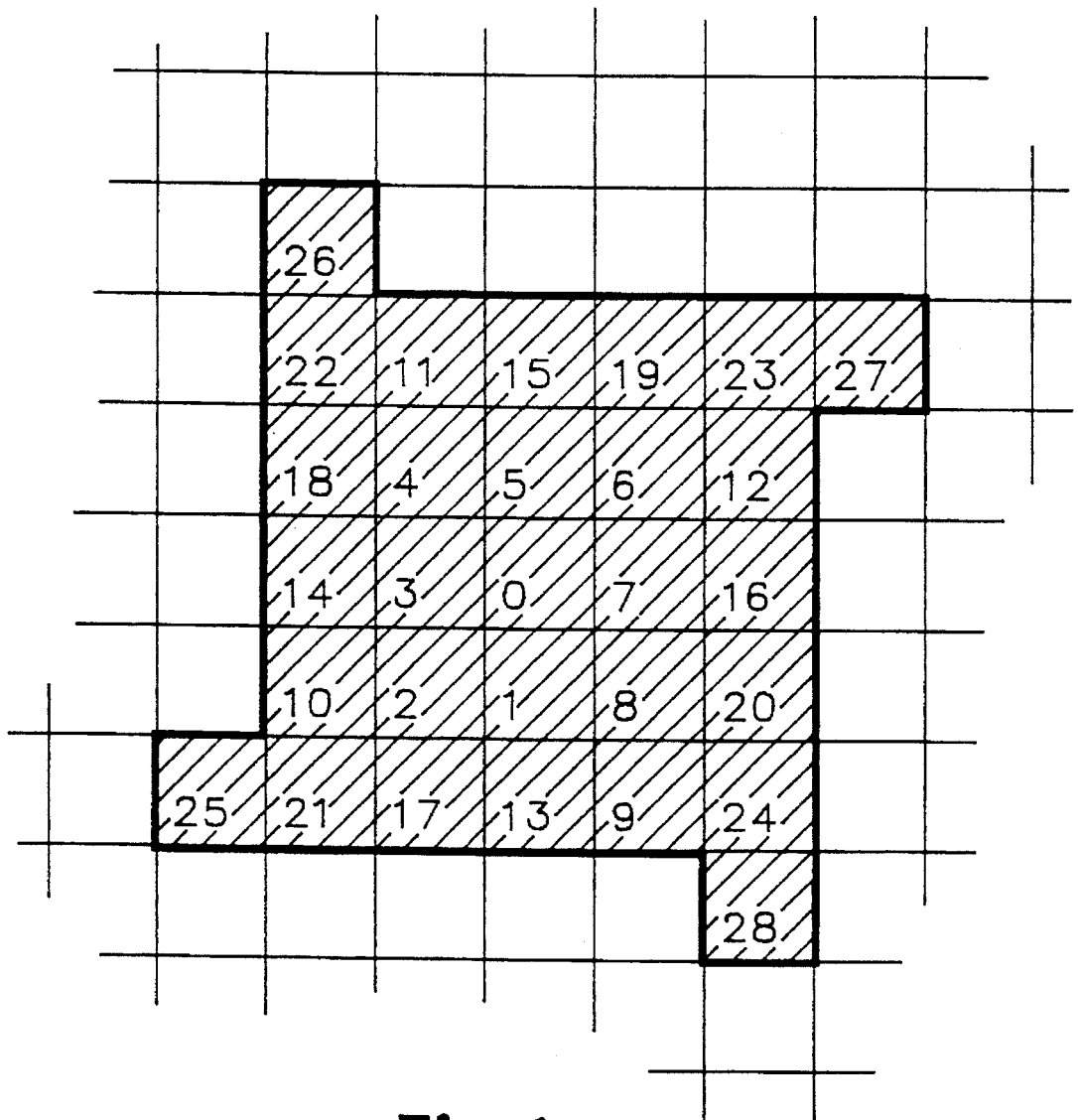
FIG. 1 shows a prior art halftone cell grouping of twenty-nine pixels.
Figure 2:
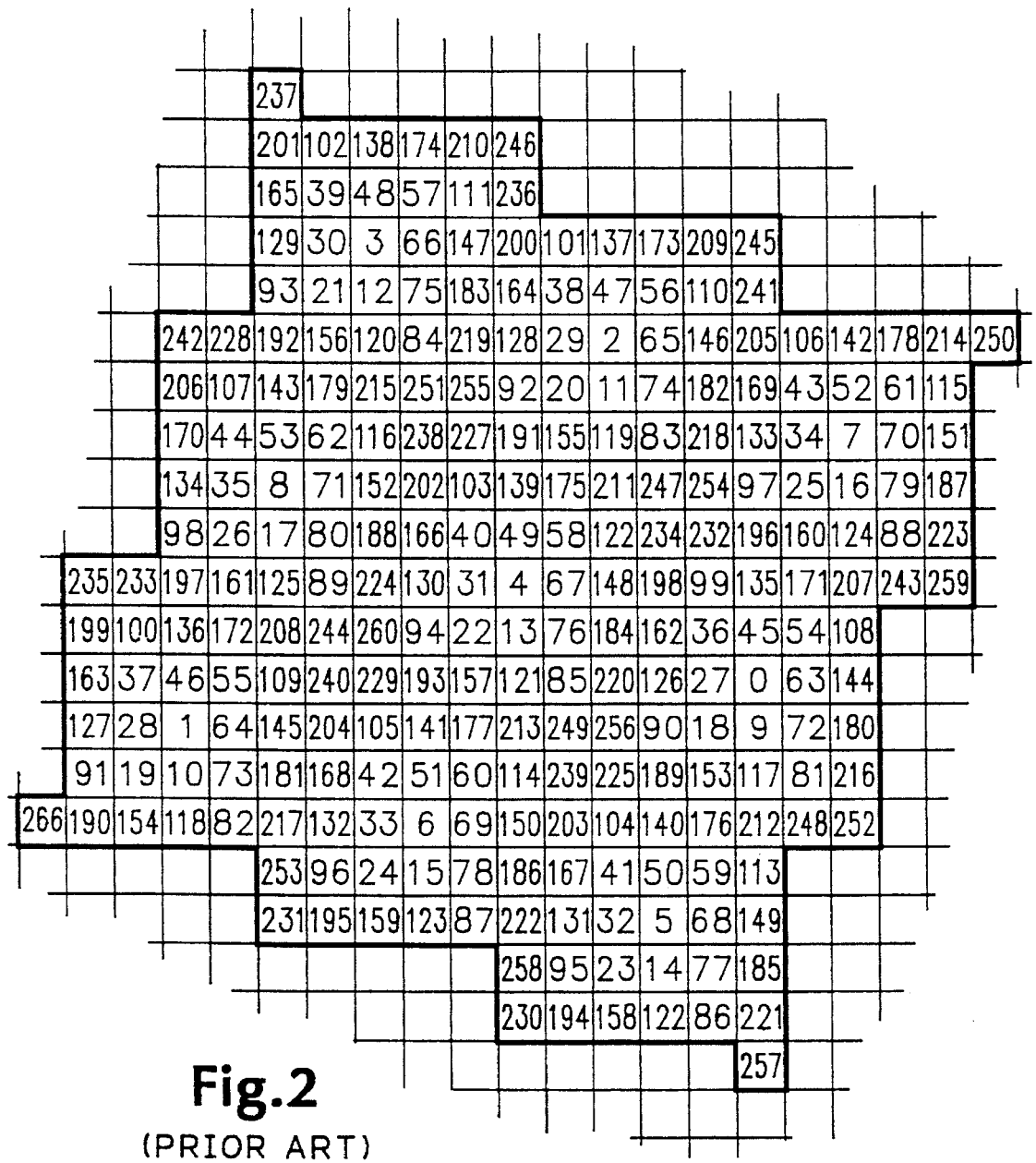
FIG. 2 shows a prior art super-cell structure and spot growth visitation order for an array of nine halftone cells of the type shown in FIG. 1.
Figure 3:
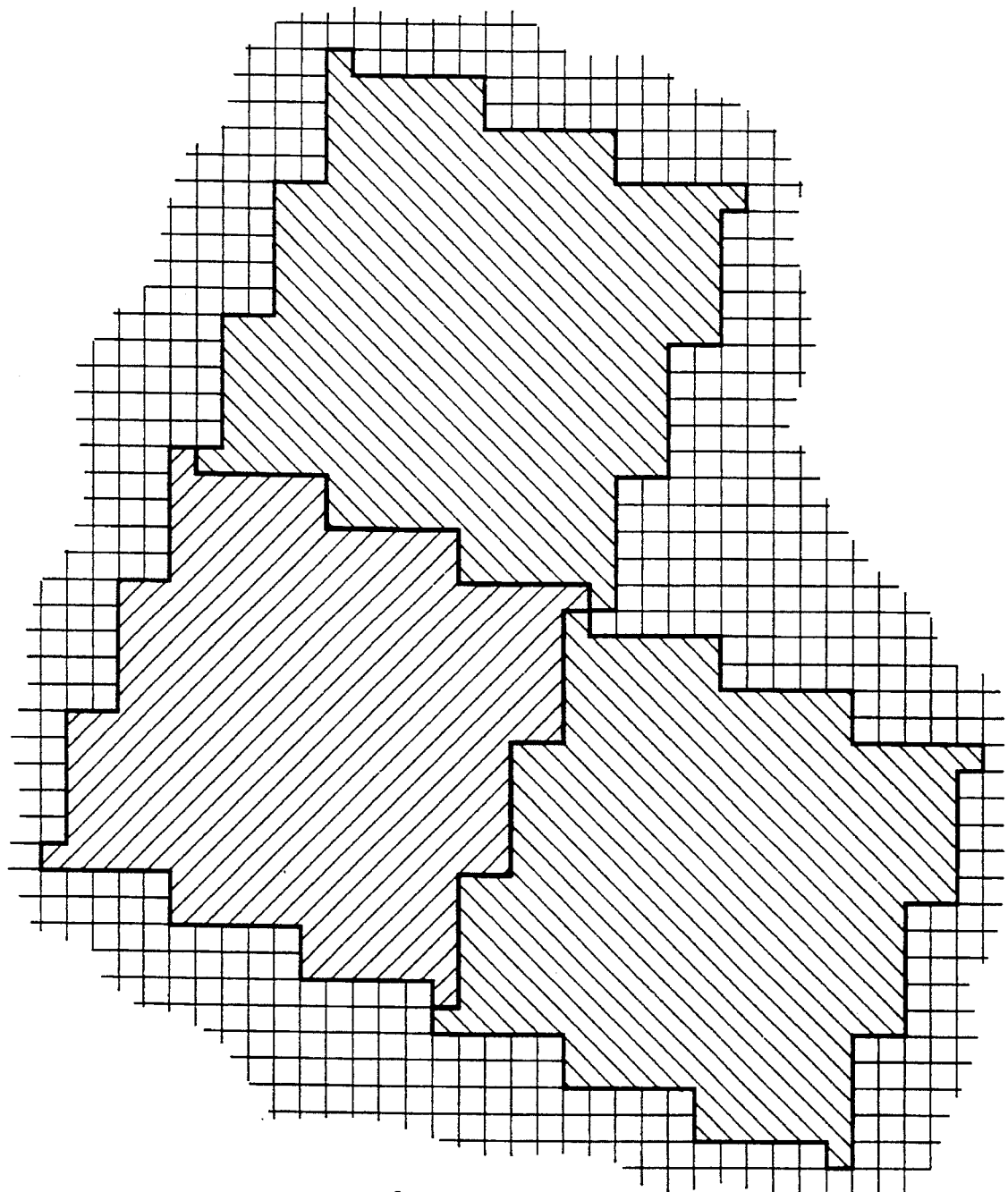
FIG. 3 shows the relative positioning of three super-cell structure of FIG. 2 to define a prior art super-cell tessellation geometry.
Figure 4:
FIG. 4 shows an image halftoned using the screen corresponding to the tessellation geometry of FIG. 3.

Comparison of FIG. 10 of the invention with FIG. 4 of the prior art reveals that the latter presents an image having spots with a variety of complex edge structures that when printed at full printer resolution can induce inconsistent darkening behavior. This results from the printer's depositing different amounts of wax or colorant for nominally the same gray scale level. The spot sizes of the FIG. 4 image appear more coarse than those of the FIG. 10 image because of the center-weighted spot growth pattern characterizing the prior art method.

There is a very distinct artifact at the frequency of the halftone cell used to form the image of FIG. 4 that is most evident in areas of uniform darkness. This is much less pronounced in the images formed by the halftone cells of FIG. 10. This effect is noticeable by comparing, for example, the patterning of the forehead of the child pictured in FIG. 4 with that pictured in FIG. 10.

Since the artifacts are distributed over three axes instead of two for images formed in accordance with the invention, rows of spots are more evident in the image of FIG. 4 as compared with the image of FIG. 10. FIG. 10 exhibits better edge definition by preserving more high frequency detail than that shown in FIG. 4. This effect is noticeable by comparing, for example, the resolution of the lips of the child pictured in FIG. 4 with that pictured in FIG. 10.

An increase in addressability to enhance printer resolution in the direction of the path of paper travel with no change in dot size will cause placement of overlapping dots when a darkening of consecutive pixels in the direction of paper motion is called for. For example, the image shown in FIG. 10 is formed on a 300×600 dpi (12×24 dpm) grid; therefore, a darkening of consecutive pixels would cause dot overlap by one-half dot length in the direction of paper motion because the paper moves in one-half dot length increments relative to the print head to achieve higher resolution in that direction.

Figure 11:
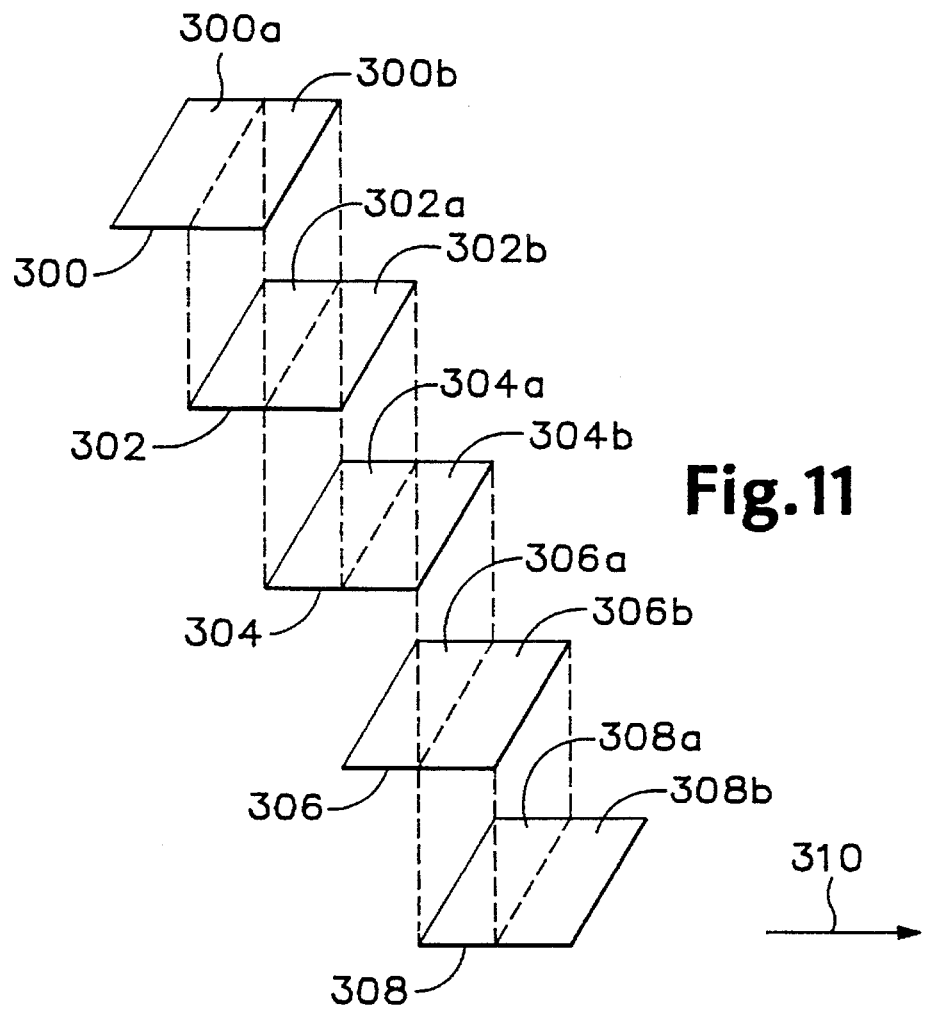
FIG. 11 is an exploded view of five consecutive pixels deposited on paper as five rectangular dots to show next adjacent dot overlap by one-half dot length.

FIG. 11 is an exploded view of five exemplary consecutive pixels deposited on paper as five rectangular dots 300, 302, 304, 306, and 308 in a 300×600 dpi (12×24 dpm) rectangular grid. (Skilled persons will appreciate that actual dots are typically rounded, the sizes and shapes depending on the thermal characteristics of neighboring dots.) In FIG. 11, dots 300, 302, 304, 306, and 308 are "lifted" in graduated steps from the paper to show clearly that next adjacent dots overlap by one-half dot length in paper travel path direction 310. Each of the dots is bisected in paper travel path direction 310 to form two half-dot regions of equal area identified by the reference numeral followed the suffices "a" and "b".

One problem associated with overlapping dots is that the heater in the print head reheats the overlapping portion of next adjacent dots. Even though the ribbon advances in one-half dot length increments so that no appreciable amount of ink is available for transfer to the overlapping portion, the application of additional heat to the overlapping portion causes it to widen and distort its shape relative to the nominal single dot profile. For example, the placement of dots 300, 302, and 304 in a consecutive three-pixel pattern would result in heating twice the regions 300b and 302a and regions 302b and 304a and cause them to be wider than the end regions 300a and 304b of the exemplary three-pixel pattern. A problem caused by excessive dot overlap is that many dots not selected for printing are nevertheless printed because residual heat in the print head is often above the melting point of the thermal wax ink ribbon.

Figure 12:
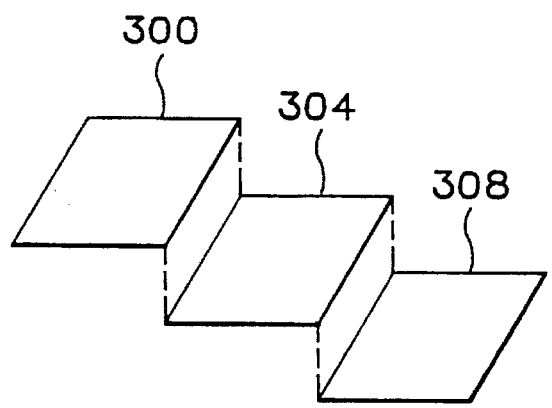
FIG. 12 is an exploded view showing the resulting dark region formed by three nonoverlapping dots deposited after bit-map decimation of the pixels corresponding to the five dots of FIG. 11.

The present invention reduces excessive dot overlap but maintains edge information by performing post-processing bit-map decimation compensation on bit map image data just before they are transmitted from the processor to the printer for printing. In the bit map, each memory site represents a pixel in either an "ON" (dark) or an "OFF" (light) state on a 300×600 dpi (12×24 dpm) grid. The fundamental principles underlying the bit-map decimation to place the pattern geometry on a 300×600 dpi (12×24 dpm) grid are described with reference to FIGS. 11 and 12. FIG. 11 shows that dots 302 and 306 are completely obscured and do not contribute to the edge detail of the dark regions. FIG. 12 shows the resultant dark region with dots 302 and 306 removed. Thus, the removal from (i.e., changing to the OFF state) the bit map data corresponding to dots 302 and 306 would render nonoverlapping dots occupying a region of the same size.

One technique for effecting bit-map decimation is to examine for each pixel in each raster (i.e., the axis of the bit map perpendicular to the axis corresponding to the paper travel path direction 310) in succession the state of the pixel above and the state of the pixel below in path direction 310 of paper travel. If both pixel states are "ON" (i.e., dark), remove the pixel by setting it to the OFF state. The next adjacent pixel in paper travel path direction 310 is similarly examined "in place," i. e., taking into account whether the immediately preceding pixel had been removed by the bit-decimation process. Thus, for example, in FIG. 11 dot 304 remains dark because dot 302, while originally represented by a pixel in the ON state, was removed by the bit-map decimation process. The bit-map decimation process prevents, therefore, the printing of a dot that would be obscured by the printing of its neighboring dots. Skilled persons will appreciate that the part overlap of only two consecutive ON state pixels needs to be maintained to preserve the definition of the lower edge of the dark region. The bit-map decimation process is repeated for each pixel in the bit map. For multiple color planes, the bit map of each of the color planes is decimated independently of the others.

Experimental trials reveal that the bit-map decimation process just described presents noticeable artifacts in halftone colors when created using high frequency halftone patterns such as the linear halftone pattern described above. The bit-map decimation process described above may be refined to suppress such artifacts and thereby ensure uniformity in halftone cells of similar darkness. This is accomplished by aligning bit-map decimation with the high frequency halftone pattern by printing ink dots that would normally be suppressed by the bit-map decimation process. This is done to recalibrate the pattern of decimated pixels to the halftone pattern. The bit-map decimation is also done "in place" for the bit map of each color plane.

Figure 13:
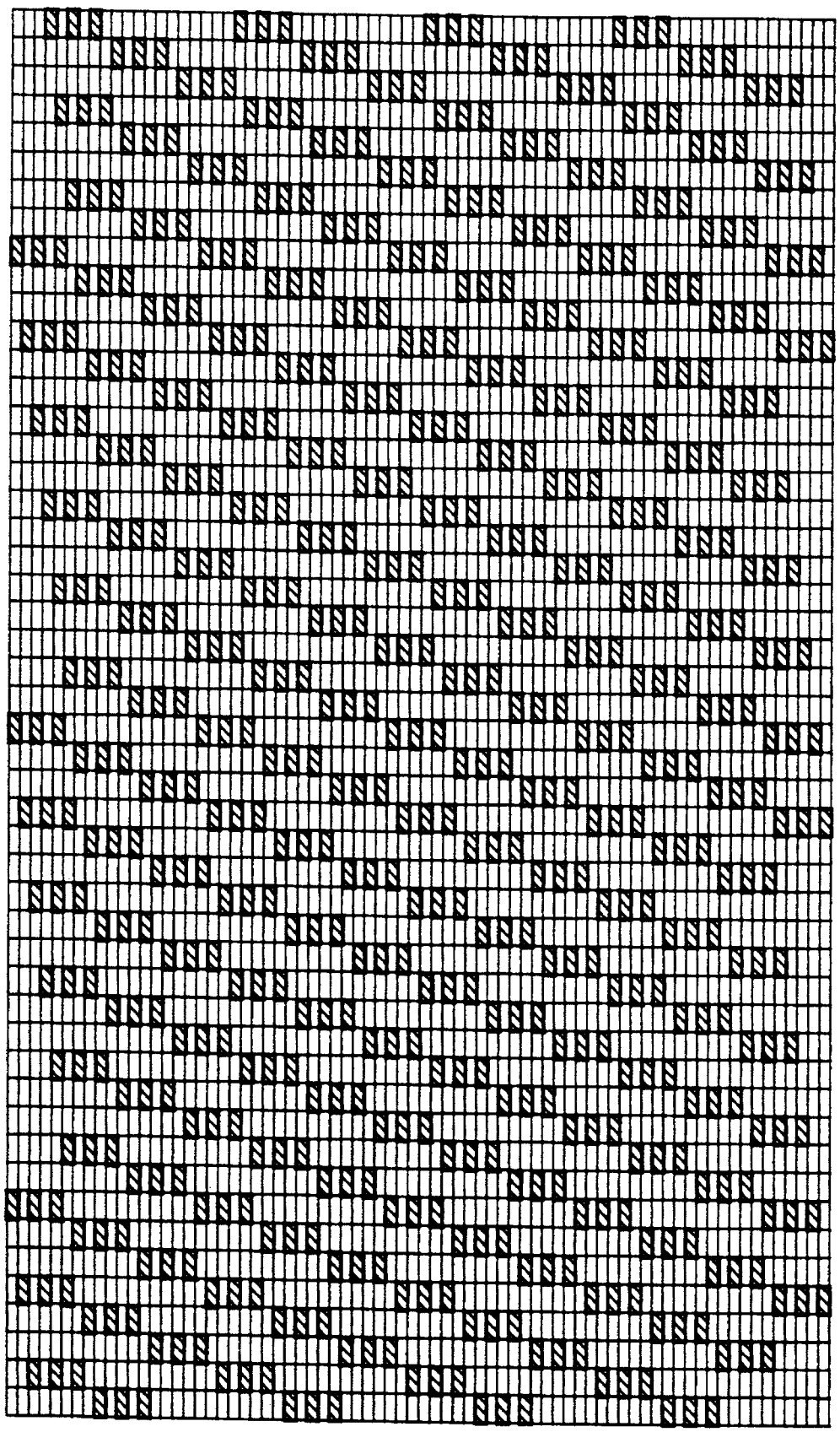
FIG. 13 shows a decimation mask for a portion of a bit-map aligned with a 17-pixel halftone cell of the invention.

In the refined bit-map decimation technique, certain pixels in each halftone cell are marked as "untouchable" in that they cannot be removed. In a preferred embodiment empirically derived, the second, fourth, and sixth pixels of a 17-pixel linear halftone cell are untouchable. FIG. 13 shows a decimation mask for a portion of a bit map. The pixel marked with an "X" represents the second pixel of the 17-pixel halftone cell. The decimation mask repeats with the same frequency as and relative position to that of the preferred 17-pixel halftone cell.

A decimation mask complements the halftone pattern used. Thus, the decimation mask of FIG. 13 marks as untouchable the second, fourth, and sixth pixels in each cell. If more pixels were marked as untouchable, the content of halftone cells would be more precisely controlled, but on average fewer pixels would be removed. The selection of the second, fourth, and sixth pixels of the 17 pixels in the halftone cell was found to be a pattern with one of the fewest number of untouchable pixels needed to avoid most decimation-halftone interference artifacts. Applicant believes that the preferred mask maintains darkness uniformity because the three untouchable pixels are among the lowest fill order positions of a linear cell that fills consecutively from the lowest order pixel to the highest order pixel. An image is most likely formed by filling these low order pixels, i.e., where the ink build-up is most likely to take place.

It will be obvious to those having skill in the art that many changes may be made to the details of the above-described embodiments of this invention without departing from the underlying principles thereof. As one example, bit-map decimation may be carried out in a direction other than, together with, or different from that corresponding to the path of paper travel to suppress artifacts resulting from dot overlap. As another example, bit map decimation may be carried out on pixels representing more than two darkness level states. The scope of the present invention should, therefore, be determined only by the following claims.

I claim:

1. A method of reducing dot overlap in a two-dimensional image printed on a print medium and represented by an array of pixels in a rendered bit map, the pixels arranged in a set of nonoverlapping lines extending in the direction of one of the two dimensions and having first and second states that correspond to respective lighter and darker printed dots, the set of nonoverlapping lines forming a supercell structure comprising:

designating certain pixels in the array as restricted pixels whose states cannot be changed;

examining for each of multiple pixels in a line included in each set of nonoverlapping lines the states of adjacent pixels in lines adjacent to the line in whose pixel is under examination;

determining whether each of the multiple pixels under examination and its adjacent pixels are in the second state and, if the pixel under examination and its adjacent pixels are not in the second state or if the pixel under examination is a designated restricted pixel, leaving unchanged the state of the pixel under examination, or, if the pixel under examination is not a designated restricted pixel and its adjacent pixels are in the second state, changing the state of the pixel under examination to a state different from the second state and thereby causing an update of the rendered bit map; and producing a completed update of the rendered bit map by repeating the examining and determining steps for multiple pixels in each of multiple lines in each set, the completed update of the rendered bit map reducing dot overlap in a printed image via linear spot growth to provide uniform darkening and the use of a supercell structure to maximize the number of gray scale levels, the printed image corresponding to the completed update of the rendered bit map.

2. The method of claim 1 in which the printed image is synthesized from halftone cells of pixels and in which fewer than one-half of the pixels in each halftone cell are designated as restricted pixels.

3. The method of claim 1 in which, during printing of an image corresponding to the completed update of the rendered bit map, the print medium and the set of nonoverlapping lines travel relative to each other in a transverse direction and in which the adjacent pixels in lines adjacent to the line in whose pixel is under examination correspond to dot positions on the print medium in a direction transverse to that in which the set of nonoverlapping lines extends.

4. The method of claim 3 in which the image is characterized by a raster direction that is collinear with the direction in which the set of nonoverlapping lines extends and has a greater resolution along the transverse direction of travel than that along the raster direction.

5. The method of claim 1 in which the image is characterized by a raster direction and has a greater resolution along the path of print medium travel than that along the raster direction.

6. A method of reducing dot overlap in a two-dimensional image printed on a print medium and represented by an array of pixels in a rendered bit map, the pixels arranged in a set of nonoverlapping lines extending in the direction of one of the two dimensions and having first and second states that correspond to respective lighter and darker printed dots, the set of nonoverlapping lines forming a supercell structure, the print medium traveling along a path that extends in a transverse direction to that of the nonoverlapping lines during printing of an image corresponding to the completed update of the rendered bit map, comprising:

designating certain pixels in the array as restricted pixels whose states cannot be changed;

examining for each of multiple pixels in a line included in each set of nonoverlapping lines the states of adjacent pixels in lines adjacent to the line in whose pixel is under examination, the adjacent pixels corresponding to dot positions on the print medium along the path of print medium travel;

determining whether each of the multiple pixels under examination and its adjacent pixels are in the second state and, if the pixel under examination and its adjacent pixels are not in the second state or if the pixel under examination is a designated restricted pixel, leaving unchanged the state of the pixel under examination, or, if the pixel under examination is not a designated restricted pixel and its adjacent pixels are in the second state, changing the state of the pixel under examination to a state different from the second state and thereby causing an update of the rendered bit map; and producing a completed update of the rendered bit map by repeating the examining and determining steps for multiple pixels in each of multiple lines in each set, the completed update of the rendered bit map reducing dot overlap in a printed image via linear spot growth to provide uniform darkening and the use of a supercell structure to maximize the number of gray scale levels, the printed image corresponding to the completed update of the rendered bit map.

7. The method of claim 6 in which the image is characterized by a raster direction that is collinear with the direction in which the set of nonoverlapping lines extends and has a greater resolution along the path of print medium travel than that along the raster direction.

8. The method according to claim 1 wherein the supercell structure is an asymmetric hexagonal grid.

* * * * *